United States Patent
Kuroda

(10) Patent No.: US 7,270,162 B2
(45) Date of Patent: Sep. 18, 2007

(54) PNEUMATIC TIRE WITH TREAD SURFACE HAVING BLOCKS WITH SIPES FORMING MEANDROUS SHAPE

(75) Inventor: Yukio Kuroda, Hiratsuka (JP)

(73) Assignee: The Yokohama Rubber Co. Ltd., Tokyo (JP)

( * ) Notice: Subject to any disclaimer, the term of this patent is extended or adjusted under 35 U.S.C. 154(b) by 114 days.

(21) Appl. No.: 11/183,919

(22) Filed: Jul. 19, 2005

(65) Prior Publication Data

US 2006/0016537 A1 Jan. 26, 2006

(30) Foreign Application Priority Data

Jul. 21, 2004 (JP) .............................. 2004-212640

(51) Int. Cl.
*B60C 11/12* (2006.01)
(52) U.S. Cl. ..................... 152/209.17; 152/209.21; 152/209.23; 152/DIG. 3; 152/902
(58) Field of Classification Search ........... 152/209.17, 152/209.18, 209.21, 209.23, DIG. 3, 902
See application file for complete search history.

(56) References Cited

U.S. PATENT DOCUMENTS

| | | | | |
|---|---|---|---|---|
| 2,272,879 | A * | 2/1942 | Hargraves | 152/DIG. 3 |
| 5,851,322 | A * | 12/1998 | Hayashi | 152/DIG. 3 |
| 2005/0016652 | A1* | 1/2005 | Iwasaki | 152/209.5 |

FOREIGN PATENT DOCUMENTS

| | | | |
|---|---|---|---|
| EP | 933235 | * | 1/1999 |
| JP | 02-246810 A | | 10/1990 |
| JP | 09-183303 A | | 7/1997 |
| WO | WO 2003/055698 | * | 7/2003 |

* cited by examiner

*Primary Examiner*—Steven D. Maki
(74) *Attorney, Agent, or Firm*—Greer, Burns & Crain, Ltd

(57) ABSTRACT

A pneumatic tire including sipes that have at least one ends positioned within blocks. The sipes are arranged such that each of the sipes meanders from the one end to the other end thereof to form a meandrous shape, and as the depth of the sipes increases, the meander width of the sipes gradually increases from their openings to at least the 80%-worn position of the blocks. The sipes each have a sipe length L, which is defined as a center line length between an intersection of a center line passing the center of the meander width of the meandrous shape with a first straight line and an intersection of the center line with a second straight line, the first straight line being orthogonally drawn to the center line from the one end of the sipe and the second straight line being orthogonally drawn to the center line from the other end of the sipe at the same depth position of the sipe, the sipe length L gradually decreasing as the sipe depth increases. The ratio $L_{80}/M_0$ of the sipe length $L_{80}$ at the 80% worn position to the opening length $M_0$ of the sipes is in the range of 0.8 to 0.95, and the ratio $M_{80}/M_0$ of the actual length $M_{80}$ of the sipes at the 80% worn position to the opening length $M_0$ is in the range of 1.0 to 1.15.

10 Claims, 3 Drawing Sheets

PNEUMATIC TIRE WITH TREAD SURFACE HAVING BLOCKS WITH SIPES FORMING MEANDROUS SHAPE

BACKGROUND OF THE INVENTION

The present invention relates to a pneumatic tire. More specifically, the present invention relates to a pneumatic tire in which wet performance degradation associated with wear progress is reduced.

Conventionally, a pneumatic tire in which blocks are defined by grooves in the tread surface has sipes provided in the blocks in order to improve drainage performance. A water film formed on a wet road surface is cut by using the edge effect of the sipes, and the blocks are brought into contact with the road surface on which the water film has been cut, whereby grip is improved. However, since the volume of the grooves decreases with the wear progress of the blocks, wet performance degradation cannot be avoided.

In this connection, Japanese patent application Kokai publication Nos. 2-246810 and 9-183303, for example, disclose pneumatic tires having sipes, each having a length that gradually increases toward the bottom of the sipe in order to reduce wet performance degradation in a worn condition. Since the length of the sipes exposed on the blocks increases with wear progress, the edge effect of the sipes increases in a worn condition. This reduces wet performance degradation.

However, in a pneumatic tire having sipes of which at least one ends do not communicate with grooves but are located within blocks to improve block rigidity, if the sipe length at a position on the bottom side of the sipe is made longer than that at a position on the block surface side thereof, the release characteristics of the blades of a mold for forming the sipes is poor, and cracks are prone to appear in the sipe walls at the sipe end portions. Furthermore, since the block rigidity in an unworn brand-new condition is lower than that of a tire in which the sipe length is constant up to the sipe bottom, wet performance in a brand-new condition is degraded.

SUMMARY OF THE INVENTION

An object of the present invention is to provide a pneumatic tire in which wet performance degradation associated with wear progress can be reduced while favorable mold release characteristics is ensured and wet performance in a brand-new condition is maintained.

In order to achieve the above object, a pneumatic tire according to the present invention includes a tread surface, blocks being defined by grooves in the tread surface, sipes extending in tread surface sections of the blocks, each of the sipes having at least one end that is positioned within the block in which it is located, wherein the sipes each have an opening in the tread surface section, and are arranged such that each of the sipes meanders from the one end to the other end thereof to form a meandrous shape, and as a depth of the sipe increases, a meander width of the sipe gradually increases from the opening to at least an 80%-worn position of the block in which it is located, wherein the sipes each have a sipe length L, which is defined as a center line length between an intersection of a center line passing a center of the meander width of the meandrous shape with a first straight line and an intersection of the center line with a second straight line, the first straight line being orthogonally drawn to the center line from the one end of the sipe and the second straight line being orthogonally drawn to the center line from the other end of the sipe at an equal depth position of the sipe, the sipe length L gradually decreasing as the sipe depth increases, and wherein ratios $L_{80}/M_0$ and $M_{80}/M_0$ satisfy the following relationships:

$$0.8 \leq L_{80}/M_0 \leq 0.95$$

$$1.0 \leq M_{80}/M_0 \leq 1.15$$

where $M_0$ (mm) is the opening length of the sipes, $L_{80}$ (mm) is the sipe length L at the 80%-worn position, and $M_{80}$ (mm) is the actual length of the sipes at the 80%-worn position.

According to the above-described present invention, by gradually decreasing the sipe length L as the sipe depth increases, the release characteristics of the blades of a mold for forming the sipes can be made favorable, and though the sipes are formed in a meandrous shape having a meander width that gradually increases, the rigidity of the blocks in a brand-new condition can be maintained at the same level as that of a tire in which the sipe length is constant to the sipe bottom; therefore, a decrease in wet performance in a brand-new condition can be avoided.

By specifying the lengths $L_{80}$ and $M_{80}$ of the sipes formed in a meandrous shape at the 80%-worn position in relation to the opening length $M_0$ as described above, the good edge effect of the sipes and block rigidity which provides a good ground-contacting property can be obtained in a worn condition, which makes it possible to reduce wet performance degradation associated with wear progress.

DESCRIPTION OF THE PREFERRED EMBODIMENT

Hereinafter, an embodiment of the present invention will be described in detail with reference to the accompanying drawings.

Figure 1:
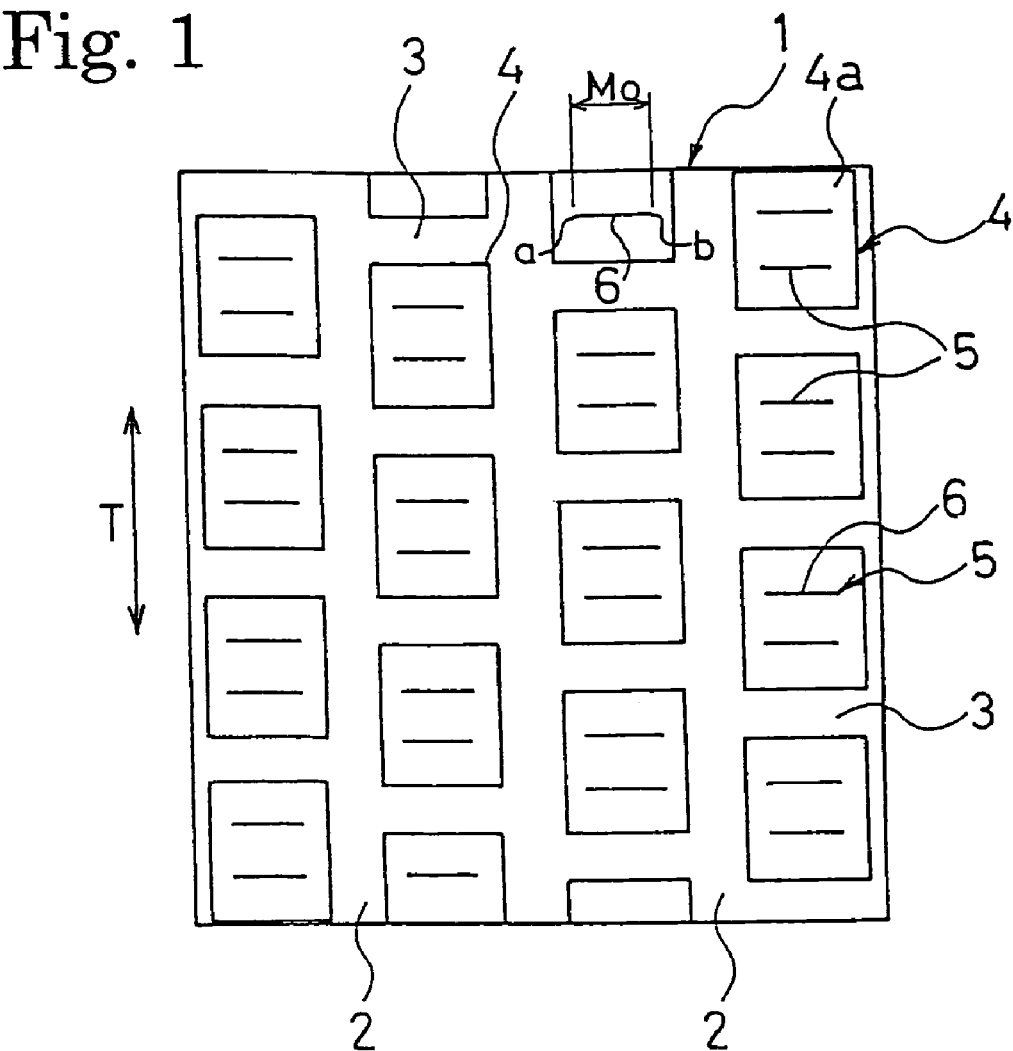
FIG. 1 is a partial tread-surface development showing one embodiment of a pneumatic tire according to the present invention.

FIG. 1 shows one embodiment of the pneumatic tire of the present invention, and reference numeral 1 denotes a tread surface. The tread surface 1 has a plurality of circumferential grooves 2 extending in the circumferential direction T of the tire and a plurality of lateral grooves 3 extending in the widthwise direction of the tire. The lateral grooves 3 are disposed at predetermined intervals in the tire circumferential direction T, and a plurality of blocks 4 are defined by the circumferential grooves 2 and the lateral grooves 3 in the tread surface 1.

Each of the blocks 4 includes a tread surface section 4a that has a plurality of sipes 5 extending in the tire widthwise direction therein. The sipes 5 do not communicate with the circumferential direction grooves 2, and both ends a and b of each sipe 5 are positioned within the block 4 where it is located. The sipes 5 may be formed so that one end of each sipe does not communicate with a circumferential groove 2 and is positioned within the block 4 where it is located, and the other end communicates with a circumferential groove 2. The sipes 5 may be ones each having at least one end which is positioned within the block 4 where it is located.

Figure 2:
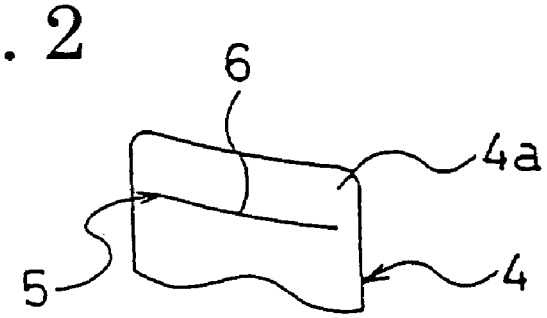
FIG. 2 is an enlarged plan view showing another example of a sipe having a curved opening.

The sipes 5 each have an opening 6 exposed on the tread surface section 4a of the block 4, the opening 6 extending linearly in the widthwise direction of the tire from one end a to the other end b. The shape of the openings 6 is not limited to the linear shape shown in the drawings, but may be of, for example, an arcuately curved line or a bending line comprising a combination of straight lines. FIG. 2 shows an example of a sipe 5 having an opening 6 that extends in an arcuately curved line with a prescribed curvature radius. When the openings 6 of the sipes 5 are formed in an arcuately curved line having a curvature radius, the curvature radius is preferably 5 mm or greater.

Figure 3:
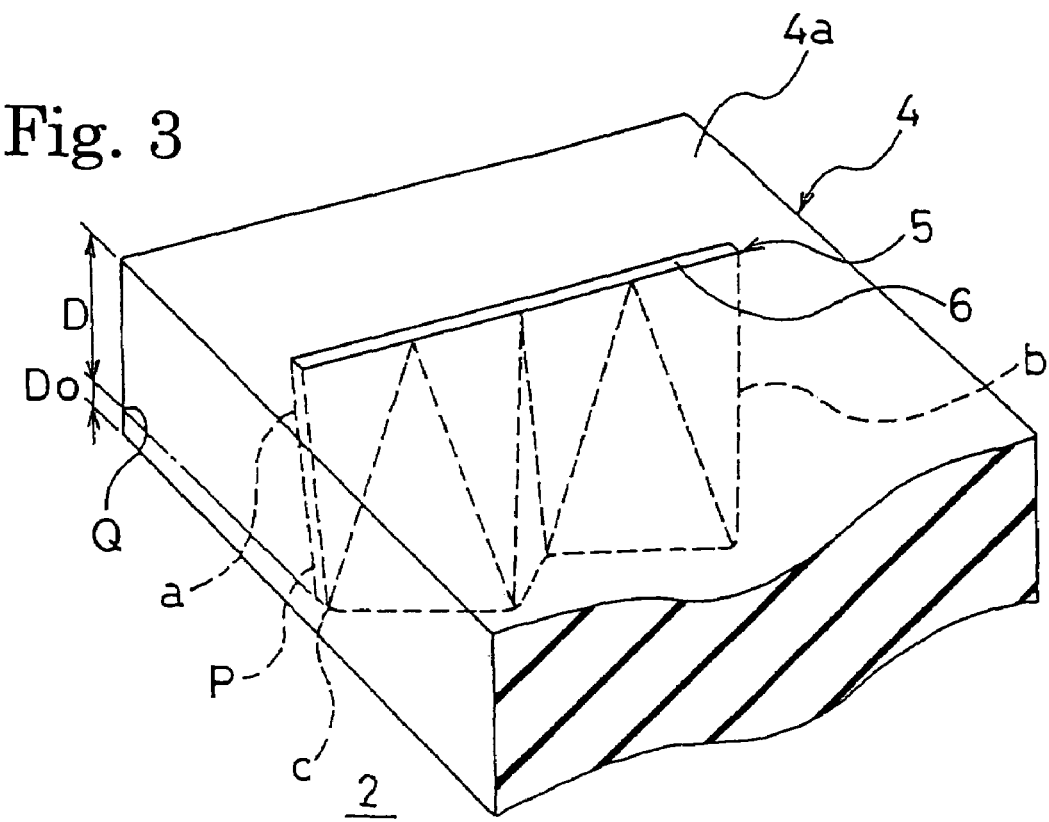
FIG. 3 is a partial enlarged perspective view of a block in FIG. 1.

As shown in FIG. 3, each sipe 5 has a depth D extending from the tread surface section 4a to a 100%-worn position Q at which the tire (block 4) is 100% worn. Note that the 100%-worn position Q referred here is the position at which a slip sign (tread wear indicator) serving as a guide for tire change appears and at which the remaining groove depth D0 of the circumferential groove 2 becomes 1.6 mm.

Figure 4:
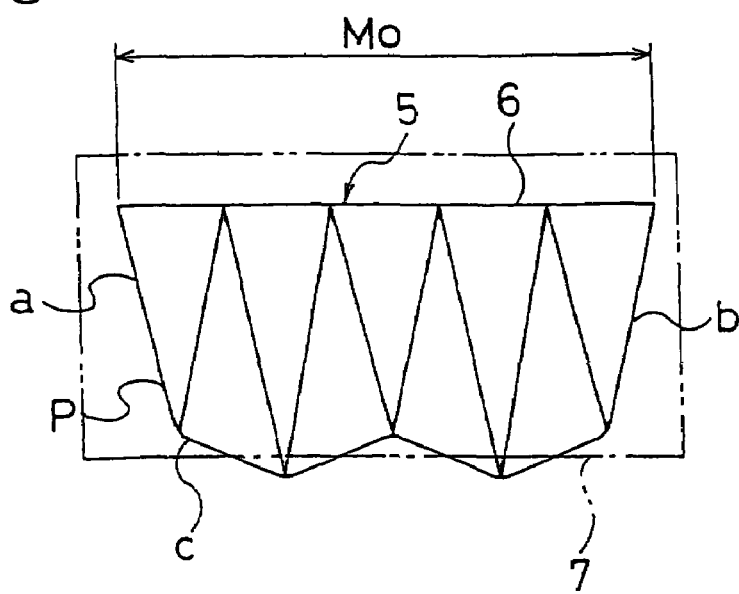
FIG. 4 is an enlarged explanatory view showing only a sipe in full line.

The sipes 5 are arranged such that each of the sipes 5 meanders with angular bends from the one end a to the other end b to form a meandrous shape, and as the sipe depth D increases, the meander width e thereof (see FIG. 5) gradually increases from the opening 6 to a 80%-worn position P of the block 4 in which it is located, preferably to the bottom c of the sipe as shown in FIGS. 3 and 4.

Figure 6:
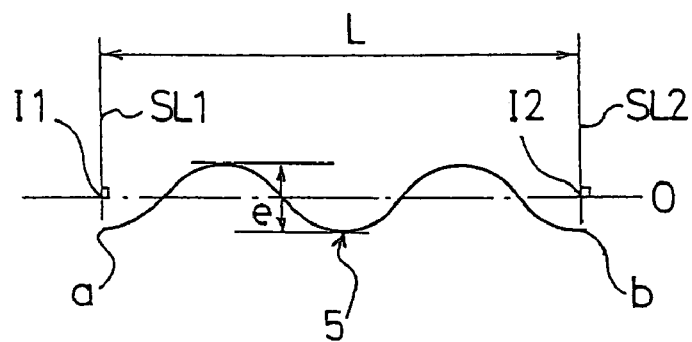
FIG. 6 is an enlarged view showing another example of the meandrous shape of the sipe.

The meandrous shape is formed to have a meander width e that meanders right and left with respect to an imaginary plane 7 which passes through the opening 6 and extends along the radial direction of the tire. Preferably, the meandrous shape is formed so as to locate the center line O of the meandrous shape, described below, on the imaginary plane 7. The meandrous shape may be one that meanders with arcuate curves instead of the angular bends. An example of the meandrous shape that meanders with arcuate curves is shown in FIG. 6.

Figure 5:
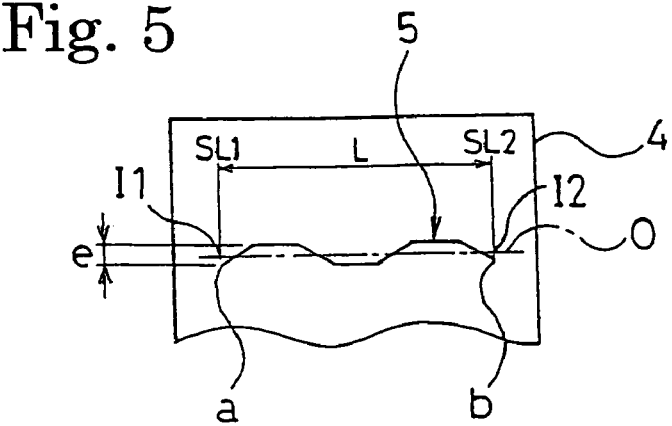
FIG. 5 is a partial enlarged view of a block when the block is cut at the same depth position of the sipe.

As shown in FIG. 5, the sipes 5 each have a sipe length L, which is defined as a center line length between an intersection I1 of a center line O passing the center of the meander width e of the meandrous shape with a straight line SL1 and an intersection I2 of the center line O with a straight line SL2, the straight line SL1 being orthogonally drawn to the center line O from the one end a and the straight line SL2 being orthogonally drawn to the center line O from the other end b at the same depth position of the sipe 5. The sipe length L gradually decreases from the opening 6 to the sipe bottom c as the sipe depth D increases. When the center line O is an arcuately curved line the straight lines SL1 and SL2 are normal lines to the center line O.

Figure 7:
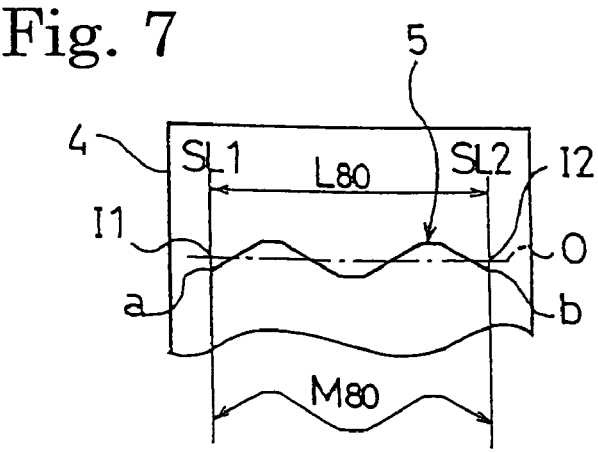
FIG. 7 is a partial enlarged view of a block when the block is cut at the 80%-worn position of the sipe.

If the opening length (actual length of the openings) of the sipes 5 is $M_0$ (mm) as shown in FIGS. 1 and 4, and if the sipe length L at the 80%-worn position P is $L_{80}$ (mm) and the actual length of the sipes 5 at the 80%-worn position P is $M_{80}$ (mm) as shown in FIG. 7, the ratios $L_{80}/M_0$ and $M_{80}/M_0$ satisfy the following relationships:

$$0.8 \leq L_{80}/M_0 \leq 0.95$$

$$1.0 \leq M_{80}/M_0 \leq 1.15$$

Note that the actual length $M_{80}$ of each sipe 5 is a length measured along the sipe 5 from the one end a to the other end b at the 80%-worn position P as shown in FIG. 7.

As described above, by gradually decreasing the sipe length L as the sipe depth D increases, the release characteristics of the blades of a mold for forming the sipes can be made favorable, and though the sipes 5 are each formed in a meandrous shape having a meander width e that gradually increases, the rigidity of the blocks in an unworn brand-new condition can be maintained at the same level as that of a tire in which the sipe length is constant to the sipe bottom; therefore, wet performance in a brand-new condition is not degraded.

By specifying the lengths $L_{80}$ and $M_{80}$ of the sipes 5 at the 80%-worn position P in relation to the opening length $M_0$ as described above, the good edge effect of the sipes 5 and block rigidity which provides a good ground-contacting property can be obtained in a worn condition. This makes it possible to reduce wet performance degradation associated with wear progress.

If the ratio $L_{80}/M_0$ is less than 0.8, it is difficult to effectively reduce wet performance degradation because of a decrease in the edge effect of the sipes in a worn condition. If the ratio $L_{80}/M_0$ is greater than 0.95, the blocks 4 are prone to tilt in a worn condition due to a reduction in block rigidity, whereby it is difficult to effectively reduce wet performance degradation.

If the ratio $M_{80}/M_0$ is less than 1.0, it is difficult to effectively reduce wet performance degradation because of a decrease in the edge effect of the sipes in a worn condition. If the ratio $M_{80}/M_0$ is greater than 1.15, heel-and-toe wear in a worn condition deteriorates in the portions of the blocks sectioned by the sipes 5.

To improve heel-and-toe wear in the block portions sectioned by the sipes 5 in a worn condition, it is preferable to set the ratio $L_{80}/M_0$ to be in the range of 0.8 to 0.9 and set the ratio $M_{80}/M_0$ to be in the range of 1.0 to 1.1.

In the above-described embodiment, a pneumatic tire in which only blocks 4 are provided in the tread surface 1 has been illustrated. However, the present invention also covers a pneumatic tire having a tread pattern with blocks and ribs, and can be applied to any pneumatic tires as long as they have sipes in the tread surface sections of blocks defined by grooves in a tread surface, each sipe having at least one end that is positioned within the block in which it is located.

EXAMPLE

Prepared were test tires according to the present invention tires 1 to 7, comparison tires 1 to 3, and conventional tire, each having a tire size of 205/65R15 and a tread pattern shown in FIG. 1, the present invention tires and comparison tires having ratios $L_{80}/M_0$ and $M_{80}/M_0$ shown in table 1, the conventional tire having sipes the length of which is constant to the bottoms of the sipes.

Evaluation tests for wet performance in a brand-new condition and in an 80%-worn condition, and heel-and-toe wear resistance of the portions of the blocks sectioned by the sipes were performed on the test tires according to the following evaluation method, obtaining the results shown in table 1.

Wet Performance in Brand-New Condition

The test tires which have not been used were seated on 15×6J sized rims, inflated to air pressure of 210 kPa, and mounted on a test vehicle of 2.4 liter displacement. On a wet-road test course, the test vehicle running at a speed of 100 km/h was braked, and the distance traveled by the test vehicle until it stopped was measured. The measurement results were represented by an index where the conventional tire is 100. As the index is greater, the braking distance is shorter, and wet performance in a brand-new condition is better.

Wet Performance in 80%-Worn Condition

The test tires which has been worn to the approximately 80%-worn position of the blocks were evaluated as in the above wet performance in a brand-new condition. The results were represented by an index where the conventional tire in a bran-new condition is 100. As the index is greater, the braking distance is shorter, and wet performance in an 80%-worn condition is better.

Heel-and-Toe Wear Resistance of Block Portions

The test tires which have not been used were mounted on a test vehicle of 2.4 liter displacement as in the above. The test vehicle was run on a dry-road test course to wear the blocks to the approximately 40%-worn position thereof, and the amount of uneven wear of the block portions was measured. The measurement results were represented by an index where the conventional tire is 100. As the index is smaller, the amount of uneven wear is smaller, and heel-and-toe wear resistance of the block portions is better.

TABLE 1

|  | $L_{80}/M_0$ | $M_{80}/M_0$ | Wet Performance Brand-New Condition | Wet Performance 80%-Worn Condition | Heel-and-Toe Wear Resistance |
|---|---|---|---|---|---|
| Conventional Tire | 1.0 | 1.0 | 100 | 70 | 100 |
| Present Invention Tire 1 | 0.95 | 1.0 | 100 | 75 | 100 |
| Present Invention Tire 2 | 0.90 | 1.0 | 100 | 85 | 90 |
| Present Invention Tire 3 | 0.85 | 1.0 | 100 | 80 | 90 |
| Present Invention Tire 4 | 0.80 | 1.0 | 100 | 75 | 80 |
| Comparison Tire 1 | 0.75 | 1.0 | 100 | 70 | 80 |
| Comparison Tire 2 | 0.80 | 0.95 | 100 | 70 | 80 |
| Present Invention Tire 5 | 0.80 | 1.05 | 100 | 75 | 80 |
| Present Invention Tire 6 | 0.80 | 1.10 | 100 | 75 | 90 |
| Present Invention Tire 7 | 0.80 | 1.15 | 100 | 75 | 100 |
| Comparison Tire 3 | 0.80 | 1.20 | 100 | 75 | 105 |

From table 1, it can be seen that the present invention tires can reduce wet performance degradation associated with wear progress while maintaining wet performance in a brand-new condition.

It can also be seen that heel-and-toe wear resistance of the block portions can be improved by setting the ratio $L_{80}/M_0$ to be in the range of 0.8 to 0.9 and by setting the ratio $M_{80}/M_0$ to be in the range of 1.0 to 1.10.

What is claimed is:

1. A pneumatic tire having a tread surface, blocks being defined by grooves in the tread surface, sipes extending in tread surface sections of the blocks, each of the sipes having at least one end that is positioned within the block in which it is located, wherein the sipes each have an opening in the tread surface section, and are arranged such that each of the sipes meanders from the one end to the other end thereof to form a meandrous shape, and as a depth of the sipe increases, a meander width of the sipe gradually increases from the opening to at least an 80%-worn position of the block in which it is located, wherein the sipes each have a sipe length L which is defined as a center line length between an intersection of a center line passing a center of the meander width of the meandrous shape with a first straight line and an intersection of the center line with a second straight line, the first straight line being orthogonally drawn to the center line from the one end of the sipe and the second straight line being orthogonally drawn to the center line from the other end of the sipe at an equal depth position of the sipe, the sipe length L gradually decreasing as the sipe depth increases, and wherein ratios $L_{80}/M_0$ and $M_{80}/M_0$ satisfy the following relationships:

$$0.8 \leq L_{80}/M_0 \leq 0.95$$

$$1.0 \leq M_{80}/M_0 \leq 1.15$$

where $M_0$ (mm) is the opening length of the sipes, $L_{80}$ (mm) is the sipe length L at the 80%-worn position, and $M_{80}$ (mm) is the actual length of the sipes at the 80%-worn position.

2. The pneumatic tire according to claim 1, wherein the ratio $L_{80}/M_0$ is in a range of 0.8 to 0.9, and the ratio $M_{80}/M_0$ is in a range of 1.0 to 1.1.

3. The pneumatic tire according to claim 1, wherein each sipe meanders right and left with respect to an imaginary plane which passes through the opening thereof and extends along a radial direction of the tire to form the meandrous shape.

4. The pneumatic tire according to claim 3, wherein the center line is located on the imaginary plane.

5. The pneumatic tire according to claim 1, wherein the depth of each sipe reaches a 100%-worn position of the block in which it is located.

6. The pneumatic tire according to claim 5, wherein the meander width of each sipe gradually increases to a bottom of the sipe.

7. The pneumatic tire according to claim 1, wherein the openings of the sipes extend in a straight line.

8. The pneumatic tire according to claim 1, wherein the openings of the sipes extend in a curved line.

9. The pneumatic tire according to claim 1, wherein each of the sipes has the other end that is positioned within the block in which it is located.

10. The pneumatic tire according to claim 1, wherein the openings of the sipes extend in a widthwise direction of the tire.

* * * * *